*INVENTOR.*
G. SOTEROPULOS

INVENTOR.
G. SOTEROPULOS

United States Patent Office 3,479,805
Patented Nov. 25, 1969

---

3,479,805
COMBINATION MOWER, CONDITIONER AND WINDROWER
Gust Soteropulos, Ottumwa, Iowa, assignor to Deere & Company, Moline, Ill., a corporation of Delaware
Filed Oct. 24, 1967, Ser. No. 677,549
Int. Cl. A01d 41/02, 41/06, 57/02
U.S. Cl. 56—23                                    3 Claims

ABSTRACT OF THE DISCLOSURE

A self-propelled mower, conditioner, and windrower having a traction unit which carries a forwardly disposed, transversely elongated, vertically adjustable header, including a forward mower bar, a harvester reel above the mower bar for feeding crops thereto and rearwardly to a pair of crop conditioning rolls rearwardly of and coextensive with the mower bar, and an auger behind the conditioner rolls for converging and rearwardly propelling the crop through a central, adjustable width discharge opening.

BACKGROUND OF THE INVENTION

This invention relates to a harvesting machine for mowing, conditioning, and windrowing forage crops such as hay or the like.

Combination machines for mowing, conditioning, and windrowing forage crops are well known, such machines reducing the number of passes through the field over harvesting systems wherein at least one of the operations is done separately. One type of combination machine has been provided by merely adding a hay conditioner attachment to a conventional swather or windrower, either of the self-propelled or pull-type, the conditioner attachment crushing or crimping the crop after the swath or crop has been converged or concentrated to conventional windrow width. However, it has been found that conditioning the concentrated crop has some disadvantages, and therefore, machines have been devised wherein the conditioner rolls are substantially coextensive with and immediately to the rear of the mower bar, so that the entire swath or crop is conditioned before it is concentrated into a windrow. Both self-propelled and pull-type machines of this type have been provided, and most of the machines have utilized a harvester reel above the mower bar and forwardly of the conditioner rolls for sweeping the crop to the mower bar and rearwardly to the conditioner rolls. In such machines, the conditioner rolls project the crop directly rearwardly, the crop being converged into a windrow by windrower shields mounted rearwardly of the conditioner rolls, the crop impinging on the shields and deflecting into the windrow. In such machines, the mower bar, reel and conditioner rolls are mounted on a header, which is vertically adjustable on a rearward main frame, either of the pull or self-propelled type, the main frame being supported on a pair of laterally spaced wheels rearwardly of the header, the wheels, or at least one of the wheels, being inwardly of the side of the header to avoid running over the standing crop. The windrow is formed between the ground-engaging support wheels, the deflector shields conventionally being angled inwardly from the full swath width at their forward end to a width less than the distance between the wheels, the rearward end of the shields being between or rearwardly of the support wheels, since the header is mounted relatively close to the wheels for proper balance of the machine. This configuration limits the adjustability of the shields and since the rearward velocity of the crop propelled by the conditioner rolls cannot be adjusted, a relatively narrow windrow is generally formed, the crop impinging on the angled shields with sufficient velocity that it is deflected toward the center of the machine.

SUMMARY OF THE INVENTION

According to the present invention, a crop converging auger is mounted on the header immediately to the rear of the conditioner rolls for converging the crop toward the center of the machine and discharging it through a rearward discharge opening in a windrow between the support wheels of the main frame. Also, according to the present invention, means are provided for varying the width of the discharge opening, so that the width of the windrow can be easily varied, and a relatively wide windrow can be formed, the windrow being adjustable to substantially the entire width between the support wheels.

Another feature of the machine resides in the fact that the width of the windrow depends only on the adjustment of the discharge opening, and is independent of the velocity at which the crop is propelled by the conditioner rolls.

DESCRIPTION OF THE PREFERRED EMBODIMENT

Figure 1:
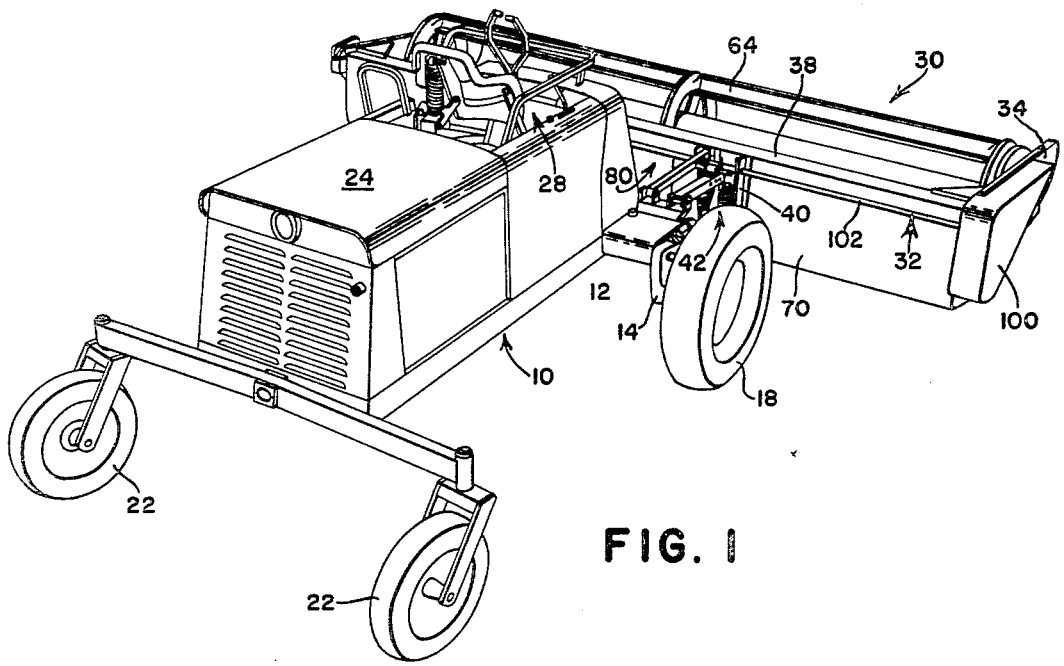
FIG. 1 is a right rear perspective of a self-propelled combination mowing, crop conditioning and windrowing machine according to the present invention.

The invention is embodied in a machine having a mobile main frame, indicated in its entirety by the numeral 10, the main frame 10 in the illustrated embodiment being in the form of a self-propelled traction unit. The main frame includes a transverse forward portion 12, from the opposite ends of which depend right and left wheel support structures 14 and 16, respectively. Right and left drive wheels 18 and 20 are coaxially and transversely spaced and are respectively mounted on the right and left supporting structures 14 and 16 at opposite sides of the machine. It is to be understood that the term "transverse" is in respect to the direction of advance of the machine (to the right in FIGS. 2 and 3), and that such terms as "right" and "left," "forwardly," "rearwardly," etc., are with reference to a person facing the direction of machine travel.

The rearward portion of the main frame 10 is supported on a pair of caster wheels 22 respectively in fore-and-aft alignment with the right and left drive wheels. A power source, conventionally an internal combustion engine, is mounted rearwardly on the frame within an engine enclosure 24 and an operator's station, indicated in its entirety by the numeral 28, is disposed forwardly of the engine enclosure 24 about the forward portion of the main frame.

The main frame carries a forward, transversely elongated harvesting header or platform, indicated generally by the numeral 30, the header including a header frame 32 having upright, fore-and-aft extending right and left side panels 34 and 36, respectively, at its opposite sides, the side panels 34 and 36 being disposed outwardly of the drive wheels 18 and 20. The header frame also includes a transverse beam 38 extending between the upper rear edges of the opposite side panels 34 and 36 and a pair of arcuate braces 40 having their upper ends connected to the transverse beam 38 and extending downwardly and curving forwardly, the forward end of the braces being disposed below the header. The braces 40 are preferably formed of conventional angle iron and are transversely spaced equidistant from the fore-and-aft center line of the header.

The header 30 is mounted for vertical adjustment on the main frame 10 through a pair of identical mounting and adjusting mechanisms 42 connecting the header to the opposite sides of the main frame 10. Each mechanism includes a fore-and-aft lower link 44, having its rearward end attached to respective wheel support structure and its forward end attached to the forward end of the respective arcuate brace 40, and a fore-and-aft upper link 46, having its rearward end pivotally connected to the forward portion 12 of the main frame and its forward end pivotally connected to the transverse upper beam member 38 of the header frame, the upper links being slightly offset inwardly from the lower links 44. Since the connecting links between the header and main frame form a parallelogram-type linkage, the attitude of the header relative to the ground is substantially constant regardless of the vertical adjustment of the header on the main frame.

The adjusting portion of each mechanism 42 includes a fore-and-aft guide arm 48, having its rearward end pivotally connected to the forward portion 12 above the lower link 44, the position of the guide arm being established by a hydraulic cylinder 50 operative between the respective wheel support structure and the guide arm. The forward end of each guide arm is connected to the respective lower links 44 by a pair of helical tension springs 52 disposed on opposite sides of a lost-motion member 54, which also connects the guide arm to the lower link. The extension of each lift cylinder 50 is controlled by the operator through appropriate valve means in the conventional manner.

Figure 3:
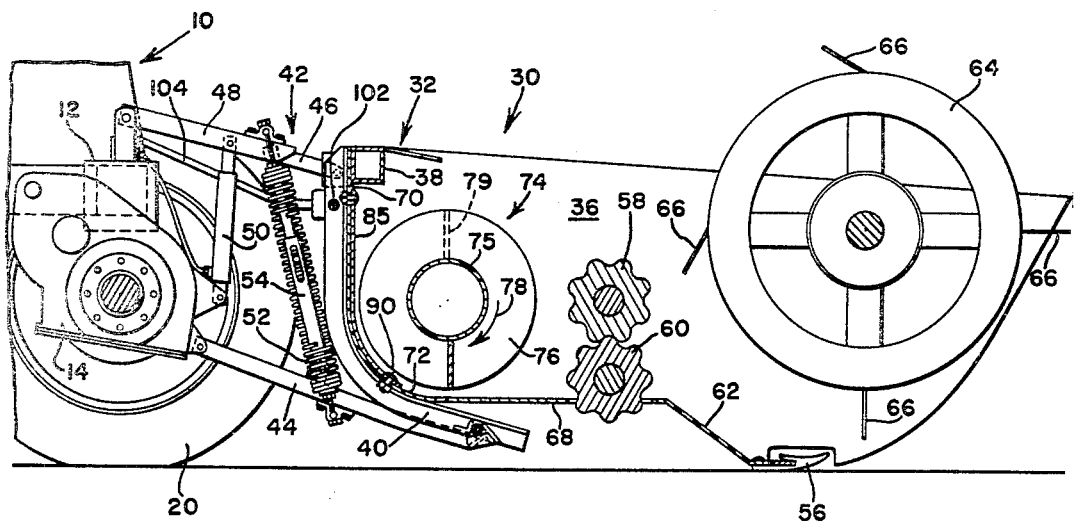
FIG. 3 is a sectional elevation view of the header portion of the machine as viewed along the line 3—3 of FIG. 2.

In normal operation, when the header is in its lowered or operating position as shown in FIG. 3, the lift cylinders are connected to the lower links 44 only through the springs 52, the lift cylinders being extended a sufficient distance so that the springs are substantially deflected and exert an upward lifting force on the links 44 partly counterbalancing the weight of the header. In this condition, the uncounterbalanced weight of the header is supported on the ground, the header being free to rise or fall to a limited degree, following the contour of the ground. To elevate the header to transport position, wherein it is spaced substantially above the ground, the cylinders 50 are extended, deflecting the springs until the lost-motion member 54 limits further extension of the springs, at which point the cylinders are connected to the lower links 44 through the lost-motion members and further extension of the cylinders raises the header.

A transverse mower bar 56 of conventional construction extends between the opposite side panels 34 and 36 along the lower leading edge of the header, and a pair of cooperating conditioner rolls 58 and 60 have their opposite ends journaled in and extend between the side panels rearwardly of the mower bar 56. An upwardly and rearwardly inclined ramp 62 extends between the rearward edge of the mower bar and the lower conditioner roll 60, the mower bar 56, ramp 62 and conditioner rolls 58 and 60 being transversely coextensive.

Also extending between the opposite side panels is an axially transverse reel 64, the reel having its opposite ends journaled in the respective side panels and having its axis above and slightly forwardly of the mower bar and above and forwardly of the conditioner rolls. The reel is of conventional construction and is somewhat schematically shown in the drawings. The reel carries four banks of spring-like fingers 66, which extend outwardly from the reel and rock relative to the reel as the reel rotates, the rocking motion being imparted to the fingers 66 through a reel cam (not shown) in a known manner. As is apparent from the drawings, as the reel rotates, the fingers 66 engage the standing crop forwardly of the header and sweep it downwardly and then rearwardly into the mower bar 56 and then sweep it rearwardly and upwardly along the ramp 62, whereupon the crop is engaged by the conditioner rolls 58 and 60 which rotate in opposite directions, the crop passing between the rolls and being conditioned thereby. As is apparent from FIG. 3, the fingers 66 retract when they are opposite the conditioner rolls to release the crop.

A generally horizontal header floor 68 extends rearwardly from the lower conditioner roll 60, the floor 68 extending between the opposite side panels coextensively with the conditioner rolls. The rearward portion of the floor 68 curves upwardly and converges with an upright rear wall 70 of the header, the upper edge of the rear wall being attached to the transverse beam 38 of the header frame. The arcuate surface at the junction of the rear wall 70 and floor 68 forms a transverse trough 72 in which a transverse auger 74 is mounted, the auger also having its opposite ends journaled in the opposite side walls and extending the width of the header. The lower and rearward sector of the auger periphery is closely adjacent to the auger trough 72.

The auger is of conventional construction and includes an axial tube 75, a helical flight 76 on its right-hand portion and a similar but oppositely wound helical flight 77 on its left-hand portion, the auger flights being wound so that when the auger is rotated in the direction of the arrow 78, it converges material to the center of the auger. A pair of diametrally opposed outwardly and longitudinally extending paddles 79 are attached to the central portion of the auger tube 75, each paddle being associated with the terminal end of one of the auger flights, only the upper paddle being apparent in FIGS. 2 and 3.

Figure 2:
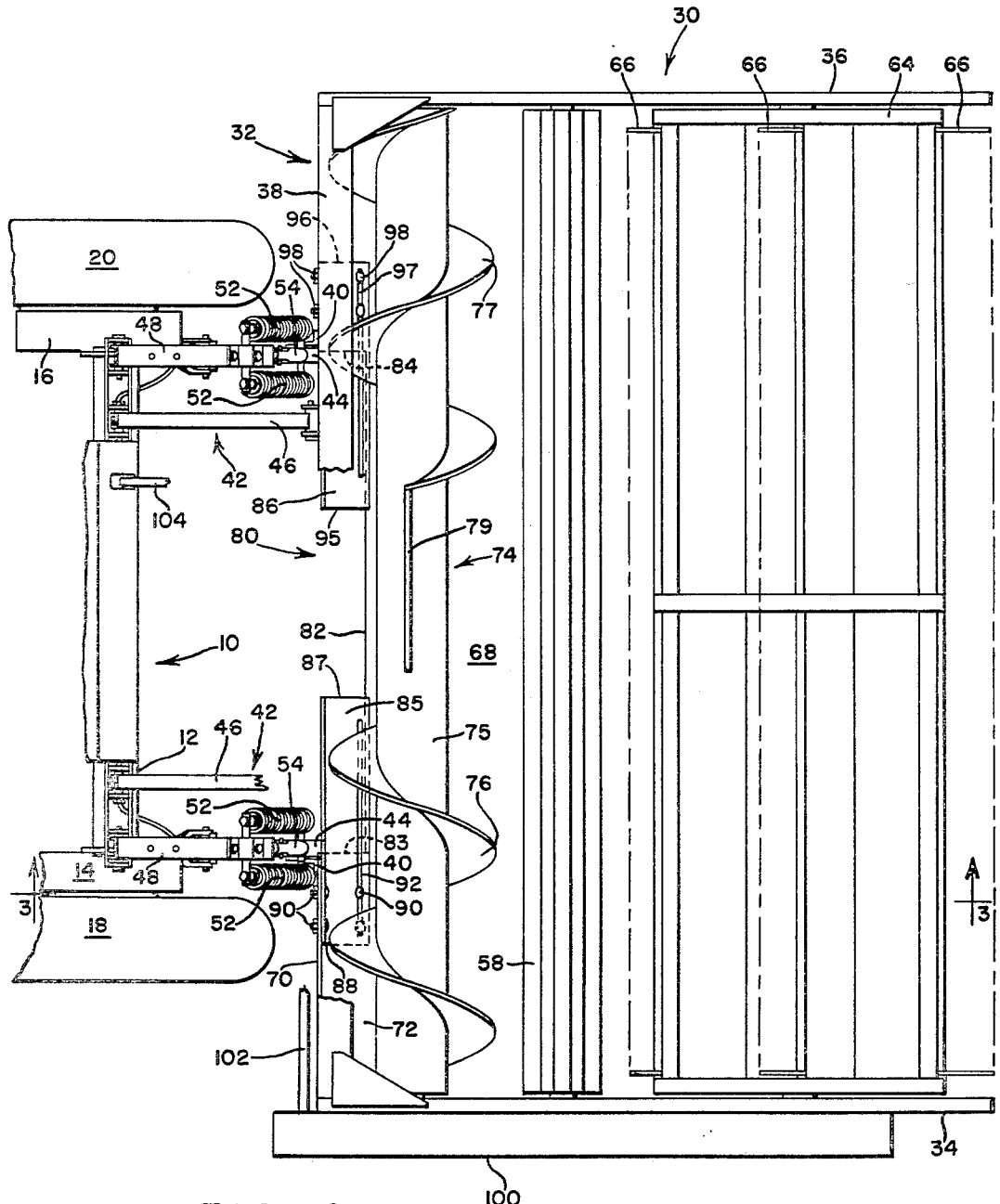
FIG. 2 is a plan view of the header portion of the machine with a portion of the structure broken away to more clearly describe the invention.

As the auger rotates, the paddles propel the crop rearwardly through a discharge opening 80 at least partly formed by an opening in the rear wall 70. The opening in the rear wall has a lower edge 82 along the arcuate portion of the rear wall, so that the edge 82 is disposed below a rearward portion of the auger 74. The opening in the rear wall also has right and left generally vertical edges 83 and 84 respectively, the edges 83 and 84 being located adjacent to the respective braces 40, so that the opening in the rear wall is substantially as wide as the spacing between the wheels 18 and 20. In FIG. 2, the central portion of the beam 38 and the central portion of the upper rear wall is broken away to more clearly disclose the discharge opening 80.

The effective width of the discharge opening 80 is adjustable through a pair of upright, transversely extending and transversely shiftable doors 85 and 86 respectively disposed on opposite sides of the discharge opening, the doors having substantially the same configuration as and seating against the inside of the rear wall. The right-hand door 85 has upright inner and outer edges 87 and 88 respectively, and is mounted on the rear wall by two pair of fasteners 90 respectively inserted through the rear wall 70 adjacent the upper and lower edges of the door 85, each pair of fasteners 90 extending through an elongated transversely extending slot 92 in the door, so that when the fasteners 90, preferably conventional nuts and bolts, are loosened, the door 85 will slide in a transverse direction until the fasteners are tightened to clamp the door against the rear wall. Similarly, the left-hand door 86 has an inner edge 95, an outer edge 96, and a pair of elongated transversely extending slots 97, a pair of fasteners 98 again extending through the rear wall and the respective slots to releasably clamp the door to the rear wall in the desired position.

The various header components are driven by the power source on the main frame 10 through a drive train, much of which is enclosed in the shielding 100 at the right-hand end of the header, the drive train including a transverse drive shaft 102 at the upper rearward edge of the header and a fore-and-aft drive shaft 104 extending from the main frame and connected to the transverse drive shaft 102 through a suitable universal joint and bevel gear box.

In operation, as previously described, the reel 64 sweeps a swath of crop downwardly and rearwardly as the machine advances, the swatch of crop being swept to the mower bar 56, which severs the crop from the field. Thereafter, the reel 64 sweeps the entire crop rearwardly and upwardly along the ramp 62 to the conditioner rolls 58 and 60, which extend the entire width of the swatch and condition the crop, projecting the conditioned crop rearwardly to the auger 74. The auger 74 rotates in the direction of the arrow 78 so that the oppositely wound auger flights 76 and 77 converge the crop toward the center of the header, at which point the auger paddles 79 propel the crop rearwardly through the discharge opening 80 onto the ground. The width of the windrow in which the crop is deposited on the ground depends on the width of the discharge opening 80, the width of the discharge opening being variable via the transversely shiftable doors 86 and 87.

In FIG. 2, the doors are shifted to their innermost position wherein the inner edges 87 and 95 of the doors define the minimum width discharge opening, the doors being locked in this position by tightening the fasteners 90 and 98 to clamp the doors to the rear wall 70. In the illustrated embodiment, the minimum discharge opening is approximately three feet in width, so that a relatively concentrated windrow is formed.

However, in some conditions, a wider, less concentrated windrow is desired, in which case the fasteners 90 and 98 are loosened and the doors 85 and 86 are shifted outwardly to the desired spacing, the fasteners 90 and 98 sliding along their respective slots 92 and 97 and being tightened again to lock the doors in their desired position. The right-hand door 85 is adapted to shift laterally until its outer edge 88 hits the side panel 34, at which point its inner edge 87 is substantially aligned with the edge 83 on the rear wall, and the left-hand door 86 is similarly shiftable outwardly until its outer edge 96 engages the side panel 36 and the edge 95 is substantially in line with the edge 84 on the rear wall. In the illustrated embodiment, each door is shiftable approximately two-and-one-half feet, so that in the outer positions of the doors, approximately an eight-foot discharge opening is provided, the maximum width of the discharge opening being approximately as great as the spacing between the wheels 18 and 20.

Since the lower edge 82 of the discharge opening is below the auger, some of the crop material will fall over the edge 82 into the windrow before it reaches the paddles 79, which propel the remainder of the crop into the center of the windrow. Of course, only one of the doors could be shifted to offset the windrow from the center of the machine, although generally the windrow is centered on the machine. Thus, the location of the auger behind the conditioner rolls permits a wide variation in the width and type of windrow formed so that the windrow can be adjusted to suit the crop conditions and the windrow pickup device on the subsequently used harvesting machine.

I claim:

1. A combined mowing, crop conditioning, and windrowing machine comprising: a mobile main frame adapted to advance over a field; a secondary frame carried by the main frame for vertical adjustment between alternate positions and having opposite lateral sides; a mower means mounted on the lower forward portion of the secondary frame, extending between the opposite sides thereof, and adapted to cut a swath of crop material substantially as wide as the secondary frame as the machine advances; a pair of parallel, axially transverse, cooperating crop conditioning rolls mounted on the secondary frame rearwardly of and substantially transversely coextensive with the mower means and adapted to receive the entire swath of crop material from the mower means, condition the crop, and impel it rearwardly; an auger trough extending between the opposite sides of the secondary frame immediately rearwardly of the conditioner rolls for receiving the crop therefrom and including a generally upright rearward wall having a central discharge opening; a pair of generally upright transversely extending and laterally spaced doors disposed on the opposite lateral sides of the discharge opening adjacent the rearward wall of the auger trough and transversely adjustable relative thereto to vary their lateral spacing and thereby vary the width of the opening; and an axially transverse auger extending between the opposite sides of said secondary frame above said auger trough and including oppositely wound helical flights extending inwardly from its opposite ends and adapted to converge the crop in the trough toward the center of the auger as the auger rotates, and discharge means at the center of the auger adapted to impel the converged crop rearwardly through the discharge opening as the auger rotates.

2. The invention defined in claim 1 and including a harvester reel means journaled on and extending between the opposite sides of the secondary frame substantially co-extensive with and above the mower means and forwardly of the conditioner rolls and adapted to direct the standing crop to the mower means and sweep the cut crop from the mower means to the conditioner rolls.

3. The invention defined in claim 1 wherein the main frame comprises a self-propelled traction unit and includes an operator's station, a power source, and a pair of laterally spaced forward drive wheels connected to and driven by the power source, and means mounting the secondary frame on the main frame forwardly thereof and for vertical adjustment relative thereto.

References Cited

UNITED STATES PATENTS

| 2,949,718 | 8/1960 | Buchanan | 56—192 |
| 3,224,177 | 12/1965 | Adee | 56—23 |
| 3,224,639 | 6/1967 | Halls et al. | 56—23 |

ANTONIO F. GUIDA, Primary Examiner

U.S. Cl. X.R.

56—1